(12) United States Patent
Sakthivel et al.

(10) Patent No.: US 11,537,423 B2
(45) Date of Patent: Dec. 27, 2022

(54) VIRTUAL RESOURCE SELECTION FOR A VIRTUAL RESOURCE CREATION REQUEST

(71) Applicant: HEWLETT PACKARD ENTERPRISE DEVELOPMENT LP, Houston, TX (US)

(72) Inventors: Thavamaniraja Sakthivel, Bangalore (IN); Siva Subramaniam Manickam, Bangalore (IN); Vinnarasu Ganesan, Bangalore (IN); Balaji Ramamoorthi, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 95 days.

(21) Appl. No.: 16/820,521

(22) Filed: Mar. 16, 2020

(65) Prior Publication Data

US 2020/0301724 A1 Sep. 24, 2020

(30) Foreign Application Priority Data

Mar. 19, 2019 (IN) .............................. 201941010745

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/4557* (2013.01); *G06F 2009/45562* (2013.01); *G06F 2009/45591* (2013.01); *G06F 2009/45595* (2013.01)

(58) Field of Classification Search
CPC .............. G06F 9/45558; G06F 9/5077; G06F 2009/45562; G06F 2009/4557; G06F 2009/45591; G06F 2009/45595
See application file for complete search history.

(56) References Cited

U.S. PATENT DOCUMENTS

| | | |
|---|---|---|
| 9,128,765 B2 | 9/2015 | Jian et al. |
| 9,405,572 B2 | 8/2016 | Breitgand et al. |
| 9,471,360 B2 | 10/2016 | Ashok et al. |

(Continued)

FOREIGN PATENT DOCUMENTS

CN 103699419 A 4/2014

OTHER PUBLICATIONS

Fu et al., "HARV: Harnessing Hybrid Virtualization to Improve Instance (Re)Usage in Public Cloud", Apr. 19, 2017, 10 pages.

(Continued)

*Primary Examiner* — Dong U Kim
(74) *Attorney, Agent, or Firm* — Mauriel Kapouytian Woods LLP (57) ABSTRACT

In some examples, a system associates, with a plurality of virtual resources deployed in a cloud environment, properties representative of characteristics of the virtual resources, the properties comprising a performance level of a virtual resource. The system receives a request to create a virtual resource in the cloud environment, and, in response to determining that properties of the virtual resource to be created for the request satisfy a criterion with respect to properties of a given virtual resource of the plurality of virtual resources, selects the given virtual resource as a candidate virtual resource for the request.

20 Claims, 4 Drawing Sheets

(56) References Cited

U.S. PATENT DOCUMENTS

| | | | |
|---|---|---|---|
| 9,641,385 B1 | 5/2017 | Daniel et al. | |
| 2012/0185913 A1* | 7/2012 | Martinez | H04L 12/66 |
| | | | 726/1 |
| 2013/0219390 A1 | 8/2013 | Lee et al. | |
| 2014/0278808 A1* | 9/2014 | Iyoob | G06Q 30/0206 |
| | | | 705/7.35 |
| 2015/0106805 A1* | 4/2015 | Melander | G06F 9/5077 |
| | | | 718/1 |
| 2015/0134424 A1* | 5/2015 | Matzlavi | G06Q 10/0637 |
| | | | 705/7.36 |
| 2016/0021019 A1* | 1/2016 | Parikh | H04L 41/0896 |
| | | | 709/226 |
| 2017/0371636 A1 | 12/2017 | Palavalli et al. | |
| 2019/0171483 A1* | 6/2019 | Santhar | G06N 20/00 |

OTHER PUBLICATIONS

Accelerite, "Optimize Cloud Infrastructure", Jan. 26, 2017, 4 pages, retrieved from Internet <https://web.archive.org/web/20170126114921/https://accelerite.com/solutions/capacityinsights/>.

Haider, H., "5 Ways to Manage Your Kubernetes Resource Usage", Replex.io, Sep. 3, 2018, 10 pages, available at: <https://www.replex.io/blog/5-ways-to-manage-your-kubernetes-resource-usage>.

RightScale, Inc., "RightScale Cloud Management Platform", Sep. 2018, 6 pages.

\* cited by examiner

VIRTUAL RESOURCE SELECTION FOR A VIRTUAL RESOURCE CREATION REQUEST

BACKGROUND

A cloud environment includes resources that are useable by tenants of the cloud environment. Examples of cloud environments include public cloud environments, private cloud environments, and hybrid cloud environments.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Examples of resources of a cloud environment that can be deployed for use by tenants of the cloud environment include any or some combination of the following: processing resources, storage resources, communication resources, programs (including machine-readable instructions), and so forth. A cloud environment can include a public cloud, which is a cloud available to tenants over a public network, such as the Internet. Alternatively, a cloud environment can include a private cloud, which is a cloud available to tenants with specified permissions, such as users within an enterprise that operates the private cloud. As a further example, a cloud environment can include a hybrid cloud, which can include a mix of public and private clouds.

In some cases, a cloud environment can include virtual resources that can be created in response to requests from tenants. A virtual resource an refer to a virtual machine, a container, or any other type of virtual resource. Programs are executable in a virtual machine or a container. Other examples of virtual resources can include a virtual storage to store data, or a virtual communication resource (e.g., a virtual switch, a virtual router, etc.) to handle routing or transfer of data through a network.

A tenant can submit a request to create a virtual resource in a cloud environment. As used here, a "tenant" can refer to an individual user, an organization (e.g., a company or a department or other group within the organization), a project, and so forth. Creating a virtual resource can refer to deploying a new instance of a virtual resource (e.g., a virtual machine) that is not already deployed.

The tenant may already have previously requested deployment of other virtual resources in the cloud environment. In some cases, some of the virtual resources may have available capacity to handle more workload. If a request to create a virtual resource results in the creation of a new virtual resource in the cloud environment without considering the existence of other already deployed virtual resources that may have excess capacity, then a tenant may incur additional costs (such as costs charged by a cloud provider for the new virtual resource) and/or power usage or usage of resources due to the creation of the new virtual resource.

In accordance with some implementations of the present disclosure, in response to a request to create a virtual resource, a system is able to determine whether an already deployed virtual resource can be used to satisfy the request, without creating a new virtual resource.

Figure 1:
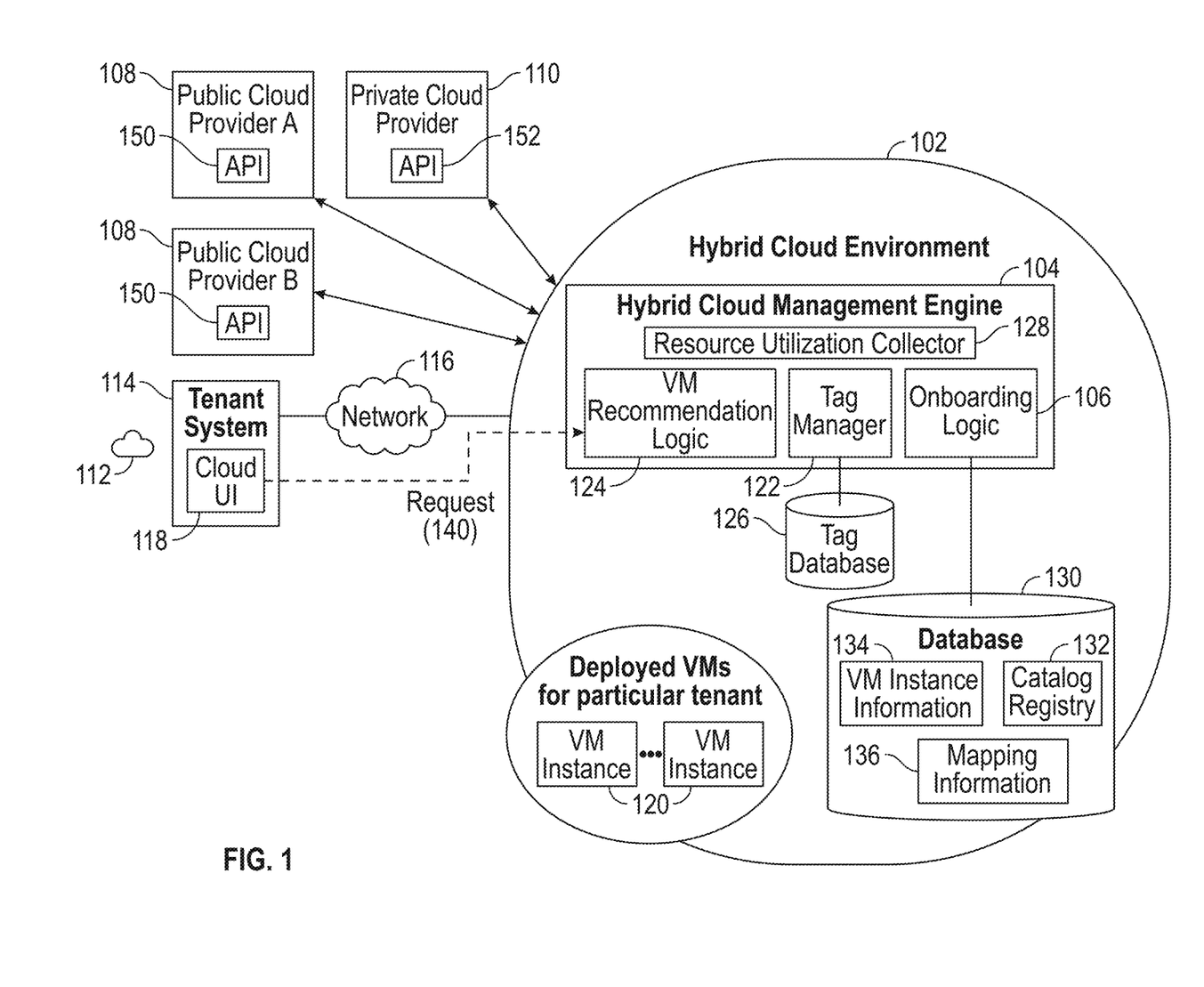
FIG. 1 is a block diagram of an example arrangement that includes a virtual resource recommendation engine and a tag manager according to some examples.

FIG. 1 is a block diagram of an example arrangement that includes a hybrid cloud environment 102 that is managed by a hybrid cloud management engine 104. As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The hybrid cloud management engine 104 includes onboarding logic 106 to onboard public cloud providers 108, such as public cloud provider A and public cloud provider B. The onboarding logic 106 can also onboard a private cloud provider 110. A public cloud provider operates a public cloud, and a private cloud provider operates a private cloud. Although specific numbers of public and private cloud providers are shown in FIG. 1, it is noted that different numbers of public and private cloud providers can be used in other examples.

Onboarding a cloud provider refers to making available resources of the respective cloud operated by the cloud provider. Onboarding a public cloud provider makes available, in the hybrid cloud environment 102, resources of the corresponding public cloud operated by the onboarded public cloud provider, and onboarding a private cloud provider refers to making available, in the hybrid cloud environment 102, resources of a private cloud operated by the onboarded private cloud provider.

Although the example of FIG. 1 depicts the hybrid cloud environment 102 in which resources of public and private clouds can be made available to tenants, it is noted that in other examples, the hybrid cloud environment 102 can be replaced with a public cloud environment or a private cloud environment.

The onboarding logic 106 can be implemented as part of the hardware processing circuit of the hybrid cloud management engine 104, or alternatively, can include machine-readable instructions executed by the hybrid cloud management engine 104.

A tenant 112 can use a tenant system 114 to access the hybrid cloud environment 102 over a network 116. The tenant 112 can refer to an individual user, an organization, or a project. The network 116 can include a public network, such as the Internet. Alternatively, the network 116 can include a different type of network, such as a local area network (LAN), a wide area network (WLAN), and so forth.

The tenant system 114 can be implemented using any of various different computing devices, such as a desktop computer, a notebook computer, a tablet computer, a smartphone, and so forth. The tenant system 114 is able to present a cloud user interface (UI) 118. The cloud UI 118 can be used by the tenant 112 to submit requests to the hybrid cloud environment 102, and more specifically, to the hybrid cloud management engine 104. For example, the cloud UI 118 can be used by the tenant 112 to submit a request to create a VM in the hybrid cloud environment 102 for the tenant 112.

As shown in FIG. 1, a number of VM instances 120 are deployed for a particular tenant, such as the tenant 112. A VM instance 120 refers to a VM instance that is deployed using resources of a public cloud or private cloud operated by a public cloud provider 108 or private cloud provider 110.

A VM instance can be deployed based on a VM image provided by a respective cloud provider. Multiple VM instances can be deployed based on the same VM image. Moreover, a cloud provider can provide multiple different VM images, such as VM images for deploying VM instances that execute different types of operating systems (OSs) and/or application programs. A "VM image" can refer to a program code (machine-readable instructions) that when executed causes the creation of an instance of the corresponding VM.

Although FIG. 1 shows just one tenant 112 and the associated tenant system 114, it is noted that there can be multiple tenants and associated tenant systems that are able to access the hybrid cloud environment 102.

Also, although reference is made to deploying VMs for tenants, it is noted that in other examples, other types of virtual resources of the hybrid cloud environment 102 can additionally or alternatively be provided to tenants.

In accordance with some implementations of the present disclosure, the hybrid cloud management engine 104 includes a tag manager 122 and a VM recommendation logic 124. In some examples, the tag manager 122 and/or the VM recommendation logic 124 can be implemented using a portion of the hardware processing circuit of the hybrid cloud management engine 104, or as machine-readable instructions executable by the hybrid cloud management engine 104.

Although FIG. 1 shows the tag manager 122, the VM recommendation logic 124, and the onboarding logic 106 as being part of the hybrid cloud management engine 104, in other examples, any or some combination of the tag manager 122, the VM recommendation logic 124, and the onboarding logic 106 can be implemented separately from the hybrid cloud management engine 104.

The tag manager 122 is able to assign tags to deployed VM instances 120 for each respective tenant. As used here "tags" can refer to attributes that represent properties of a VM. Examples of properties of a VM can include any or some combination of the following: a VM image that is used to deploy the VM, a number of virtual central processing units (CPUs) of the VM, a storage capacity of a memory for the VM, a storage performance expected of the VM, a networking performance expected of the VM, and so forth. The virtual CPU property and storage capacity property are examples of a property relating to a resource of a VM. The VM image property can also be considered a property that relates to an OS used in a VM instance created based on the VM image.

Although example properties of the VMs are listed above, it is noted that in other examples, alternative or additional properties can be represented by respective tags.

The tag manager 122 can maintain a tag database 126 (or other type of data structure) that correlates tags to respective deployed VM instances.

As an example, the following Table 1 shows an example of tag correlation information (for correlating tags to respective VM instances) that can be included in the tag database 126.

TABLE 1

| UID (Image_CPU_Mem_StoragePerformance_NetworkPerformance) | VM Instance | Cloud Provider |
|---|---|---|
| Image1_2_8_LM_LM | Deployment1 | Provider A |
| Image2_1_2_L_L | Deployment2 | Provider A |
| Image3_1_2_L_L | Deployment3 | Provider B |
|  | Deployment7 | Provider B |
| Image4_2_4_LM_LM | Deployment4 | Provider C |
| Image5_8_32_H_H | Deployment5 | Provider B |
|  | Deployment6 | Provider B |
| Image6_8_32_L_L | Deployment8 | Provider D |

In the example Table 1 above, eight different deployed VM instances are referred to as "Deployment 1," "Deployment 2," "Deployment 3," . . . "Deployment8." A unique identifier (UID) in the first column of Table 1 includes the tags associated with a respective deployed VM instance. In the example of Table 1, the tags make up a UID for the corresponding VM instance. For example, the UID can include a string of the tags associated with the corresponding VM instance. In Table 1, the UID has the form Image_CPU_Mem_StoragePerformance_NetworkPerformance, which is a string of the following tags: Image (an attribute that identifies a VM image used to create the VM instance), CPU (an attribute that identifies a number of virtual CPUs of the VM instance), Mem (an attribute that identifies a storage capacity of a memory for the VM instance), StoragePerformance (an attribute that identifies a storage performance expected of the VM instance), and NetworkPerformance (an attribute that identifies a networking performance expected of the VM instance).

In the first row of Table 1 for the VM instance labelled Deployment1, the UID has the form Image1_2_8_LM_LM, which indicates that a VM image named Image) was used to create the VM instance, the number of virtual CPUs is 2, a storage capacity of a memory for the VM instance is 8 gigabytes (GB), the storage performance has level "LM," and the networking performance has level "LM."

The third row of Table 1 indicates that Image3 is used to create VM instances Deployment3 and Deployment7.

In some examples, the storage performance can be expressed as low (L), low to moderate (LM), or high (H).

Similarly, the networking performance can be expressed as low (L), low to moderate (LM), and high (H). The storage performance of L indicates that the corresponding VM instance is expected to have a low storage capacity. The storage performance of LM indicates that the VM instance is expected to have an intermediate storage performance, while a storage performance of H indicates that the VM instance is expected to have a high storage capacity.

Similarly, a networking performance of L indicates that the networking capacity of the VM instance is expected to be low, a networking performance of LM indicates that the networking capacity of the VM instance is expected to be intermediate, and a networking performance of H indicates that the networking capacity of the VM instance is expected to be high.

In other examples, the storage performance and/or the networking performance can be expressed using other metrics.

In the example Table 1 above, a third column identifies a cloud provider for each VM instance, including providers A, B, C, and D in the example of Table 1.

Although a specific example is shown in Table 1, it is noted that in other examples, a different format can be used to correlate deployed VM instances to corresponding properties (as represented by tags) of the VM instances.

Also, instead of using a UID that includes a string of tags associated with each respective VM instance, in a different example, the UID can include a number or a character string that maps to another data structure that correlates each UID to corresponding properties of the VM instance.

The hybrid cloud management engine 104 can also include a resource utilization collector 128, which can be implemented using a portion of the hardware processing circuit of the hybrid cloud management engine 104, or as machine-readable instructions executable by the hybrid cloud management engine 104. Alternatively, the resource utilization collector 128 can be separate from the hybrid cloud management engine 104.

The resource utilization collector 128 is able to interact with each cloud provider, such as with an application programming interface (API) 150 or 152 of the respective cloud provider, to collect utilization metrics associated with respective VM instances that are deployed for tenants. A utilization metric can indicate a portion of a resource that is utilized, or an available portion of a resource that is still available for allocation, and so forth. For example, given a VM instance, a utilization metric can indicate a portion of the given VM instance that is consumed, such as a number of the virtual CPUs of the given VM instance that is (are) performing a workload, an amount of the memory of the given VM instance that is used to store data, and so forth.

The metrics collected by the resource utilization collector 128 can be used to update the tag database 126, for indicating the utilization of each respective deployed VM instance. For example, Table 2 below adds another column (Utilization<Threshold) to Table 1, where the added column provides a parameter indicating whether or not utilization of a corresponding VM instance is below a utilization threshold (e.g., 20%, 10%, 50%, etc.).

TABLE 2

| UID | VM Instance | Cloud Provider | Utilization < Threshold |
|---|---|---|---|
| Image1_2_8_LM_LM | Deployment1 | Provider A | No |
| Image2_1_2_L_L | Deployment2 | Provider A | No |

TABLE 2-continued

| UID | VM Instance | Cloud Provider | Utilization < Threshold |
|---|---|---|---|
| Image3_1_2_L_L | Deployment3 | Provider B | No |
|  | Deployment7 | Provider B | No |
| Image4_2_4_LM_LM | Deployment4 | Provider C | No |
| Image5_8_32_H_H | Deployment5 | Provider B | No |
|  | Deployment6 | Provider B | Yes |
| Image6_8_32_L_L | Deployment8 | Provider D | Yes |

A first value ("Yes" or a logic high in Table 2) of the Utilization<Threshold column can indicate that utilization of the respective VM instance is below the threshold, whereas a second value ("No" or a logic low in Table 2) of the Utilization<Threshold column can indicate that utilization of the VM instance is not below the threshold.

In other examples, instead of storing values indicating whether or not utilization of a VM instance is below a threshold, actual utilization metric values can be included in Table 2.

Figure 2:
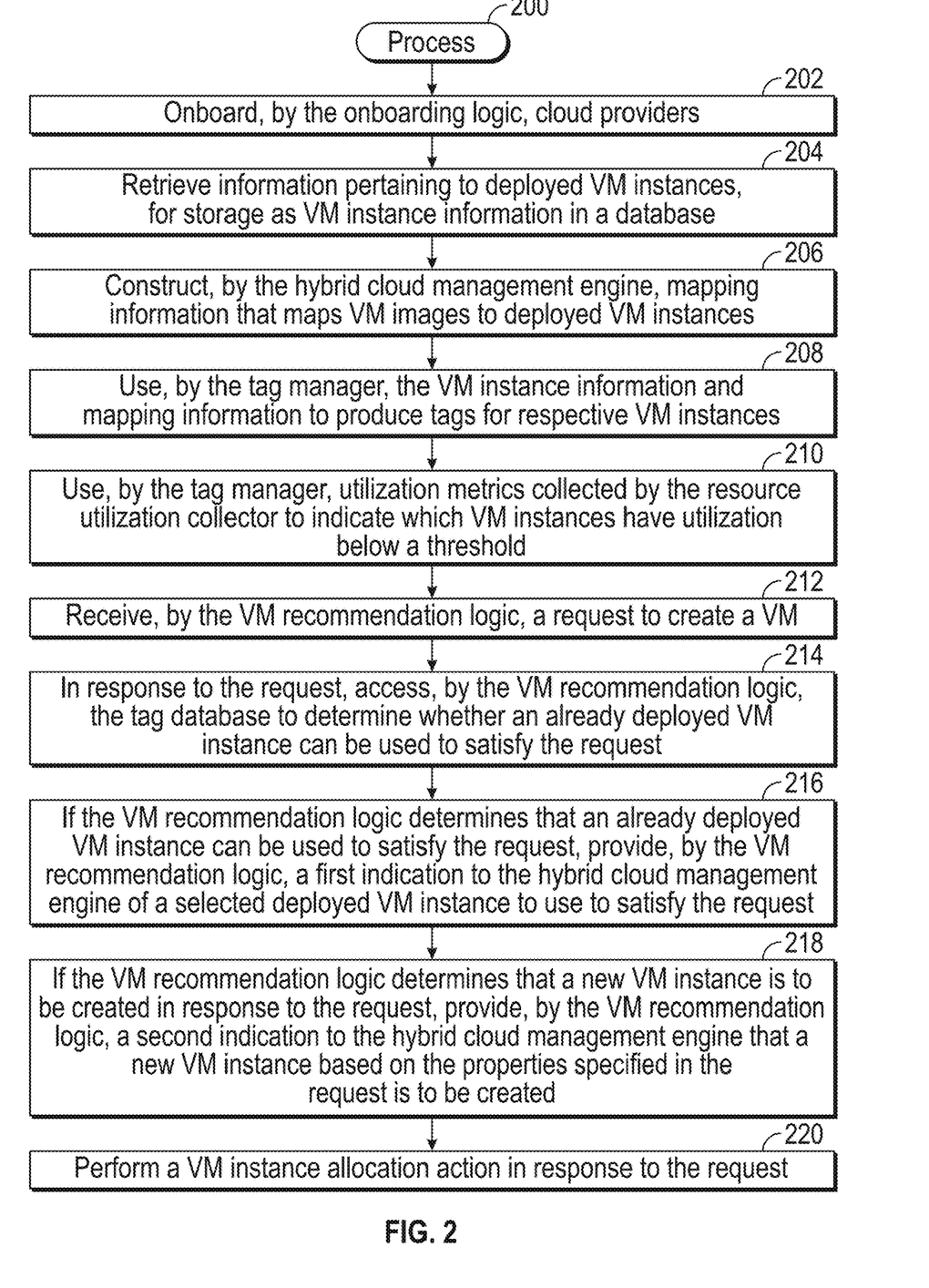
FIG. 2 is a flow diagram of a process according to some examples.

Referring further to FIG. 2, a process 200 is shown that can be performed by various components of the hybrid cloud management engine 104. The following discussion also refers to FIG. 1.

The process 200 includes onboarding (at 202), by the onboarding logic 106, cloud providers. Once a cloud provider is onboarded, VM images for the cloud provider can be retrieved by the onboarding logic 106 (from data repositories maintained by the onboarded cloud providers) and stored in a catalog registry 130 (or other type of data structure) contained in a database 130. The catalog registry 132 can maintain, for each cloud provider, respective VM images for respective different types of VMs (such as VMs employing different types of OSs or application programs).

An example catalog registry is provided in Table 3 below.

TABLE 3

| Catalog Type | Catalog Images |
|---|---|
| Provider A Images | Image1 |
|  | Image2 |
| Provider B Images | Image3 |
|  | Image5 |
| Provider C Images | Image4 |
| Provider D Images | Image6 |

The first column of Table 3 indicates a type, which in this example refers to a type of image provided by a respective cloud provider. The second column of Table 3 indicates the images available for each type. For example, the first row of Table 3 indicates that two images (Image1 and Image2) are available for type Provider A Images.

In other examples, the catalog registry 132 can have a different format.

The process 200 can also further retrieve (at 204) information pertaining to various deployed VM instances, for storage as VM instance information 134 in the database 130.

TABLE 4

| Provider | VM Instance | CPU | Mem | Storage Performance | Networking Performance |
|---|---|---|---|---|---|
| Provider A | Deployment1 | 2 | 8 | LM | LM |
|  | Deployment2 | 1 | 2 | L | L |
| Provider B | Deployment3 | 1 | 2 | L | L |
|  | Deployment5 | 8 | 32 | H | H |

TABLE 4-continued

| Provider | VM Instance | CPU | Mem | Storage Performance | Networking Performance |
|---|---|---|---|---|---|
| | Deployment6 | 8 | 32 | H | H |
| | Deployment7 | 1 | 2 | L | L |
| Provider C | Deployment4 | 2 | 4 | LM | LM |
| Provider D | Deployment8 | 8 | 32 | L | L |

In Table 4, columns 3 to 6 include properties (number of virtual CPUs, memory capacity, storage performance, and networking performance) of each deployed VM instance. The first column of Table 4 identifies the respective cloud provider, and the second column of Table 4 identifies the deployed VM instance.

In other examples, the VM instance information 134 can have a different format.

The process 200 further includes constructing (at 206), by the hybrid cloud management engine 104, mapping information 136 that maps VM images to deployed VM instances. The mapping information 136 can also be stored in the database 130.

An example of the mapping information 136 is shown in Table 5 below.

TABLE 5

| Catalog Images | VM Instance | Cloud Provider |
|---|---|---|
| Image1 | Deployment1 | Provider A |
| Image2 | Deployment2 | Provider A |
| Image3 | Deployment3 | Provider B |
| Image4 | Deployment4 | Provider C |
| Image5 | Deployment5 | Provider B |
| Image5 | Deployment6 | Provider B |
| Image3 | Deployment7 | Provider B |
| Image6 | Deployment8 | Provider D |

In Table 5, the first column identifies the various VM images, and the second column identifies respective VM instances that have been deployed. The third column identifies the respective cloud provider.

In other examples, the mapping information 136 can have a different format.

The process 200 includes using (at 208), by the tag manager 122, the VM instance information 134 and mapping information 136 to produce tags for respective VM instances, such as in Table 1 above (stored in the tag database 126).

Moreover, the process 200 includes using (at 210), by the tag manager 122, utilization metrics collected by the resource utilization collector 128 to indicate which VM instances have utilization below a threshold, such as in Table 2 above (stored in the tag database 126).

The process 200 receives (at 212), by the VM recommendation logic 124, a request (140) to create a VM. In response to the request 140, the VM recommendation logic 124 accesses (at 214) the tag database 126 to determine whether an already deployed VM instance 120 can be used to satisfy the request 140. This determination can be based on determining whether properties of the VM to be created (as specified in the request 140) matches properties of any of the already deployed VM instances 120. As used here, properties of a VM to be created "matches" properties of an already deployed VM instance if the properties of the VM to be created are identical or otherwise similar to within a specified tolerance to properties of the already deployed VM instance. Note that in some examples, a matching already deployed VM instance 120 to be used for the request 140 can be based on whether the selected already deployed VM instance 120 has a utilization below the threshold (see Table 2 above for example). In some cases, the matching already deployed VM instance 120 is selected for the request 140 if the matching already deployed VM instance 120 has a utilization below the threshold. In other examples, the matching already deployed VM instance 120 can be selected for the request 140 regardless of whether its utilization is below the threshold.

In examples where properties of multiple already deployed VM instances match the properties of a VM to be created, then the VM recommendation logic 124 can select one of the multiple already deployed VM instances based on a criterion. For example, the criterion can include which of the multiple already deployed VM instances has the least utilization.

If the VM recommendation logic 124 determines that an already deployed VM instance can be used to satisfy the request, then the VM recommendation logic 124 provides (at 216) a first indication to the hybrid cloud management engine 104 of a selected deployed VM instance to use to satisfy the request 140. However, if the VM recommendation logic 124 determines that a new VM instance is to be created in response to the request, then the VM recommendation logic 124 provides (at 218) a second indication to the hybrid cloud management engine 104 that a new VM instance based on the properties specified in the request 140 is to be created.

In response to the first indication or the second indication, the hybrid cloud management engine 104 performs (at 220) a VM instance allocation action in response to the request 140. The VM instance allocation action includes allocating, in response to the first indication, the selected deployed VM instance to the requesting tenant. Alternatively, the VM instance allocation action includes creating a new VM instance for the requesting tenant in response to the second indication.

Figure 3:
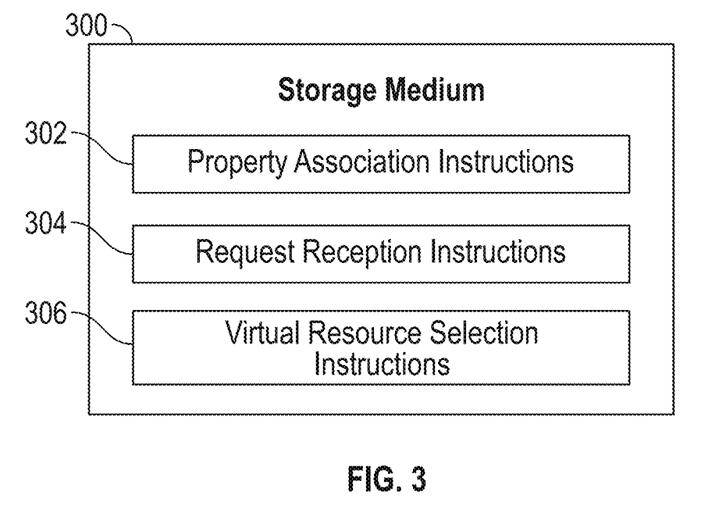
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a system to perform various tasks.

The machine-readable instructions include property association instructions 302 to associate, with a plurality of virtual resources (e.g., VMs and/or other types of virtual resources) deployed in a cloud environment, properties representative of characteristics of the virtual resources, the properties comprising a performance level of a virtual resource. For example, the performance level can be the storage performance, networking performance, etc., as noted above.

The machine-readable instructions include request reception instructions 304 to receive a request to create a virtual resource in the cloud environment. The request is received from a tenant of the cloud environment, and the plurality of virtual resources are associated with the tenant (e.g., have been previously deployed in the cloud environment for the tenant).

The machine-readable instructions further include virtual resource selection instructions 306 to, in response to determining that properties of the virtual resource to be created for the request satisfy a criterion with respect to properties of a given virtual resource of the plurality of virtual resources, select the given virtual resource as a candidate virtual resource for the request. Properties of the virtual resource to be created for the request satisfy a criterion with respect to properties of the given virtual resource if the properties match or are similar to within a specified tolerance (e.g., a similarity metric computed based on comparing properties indicates similarity greater than a similarity threshold).

In some examples, the machine-readable instructions include instructions to monitor utilizations of the plurality of virtual resources. Selection of the given virtual resource as a candidate virtual resource for the request is based on the monitored utilizations. For example, an already deployed virtual resource can be used to satisfy the request (instead of creating a new instance of the virtual resource) if the utilization of the already deployed virtual resource is less than a utilization threshold (and assuming the already deployed virtual resource has properties that satisfy the criterion with respect to the properties of the virtual resource to be created for the request).

Figure 4:
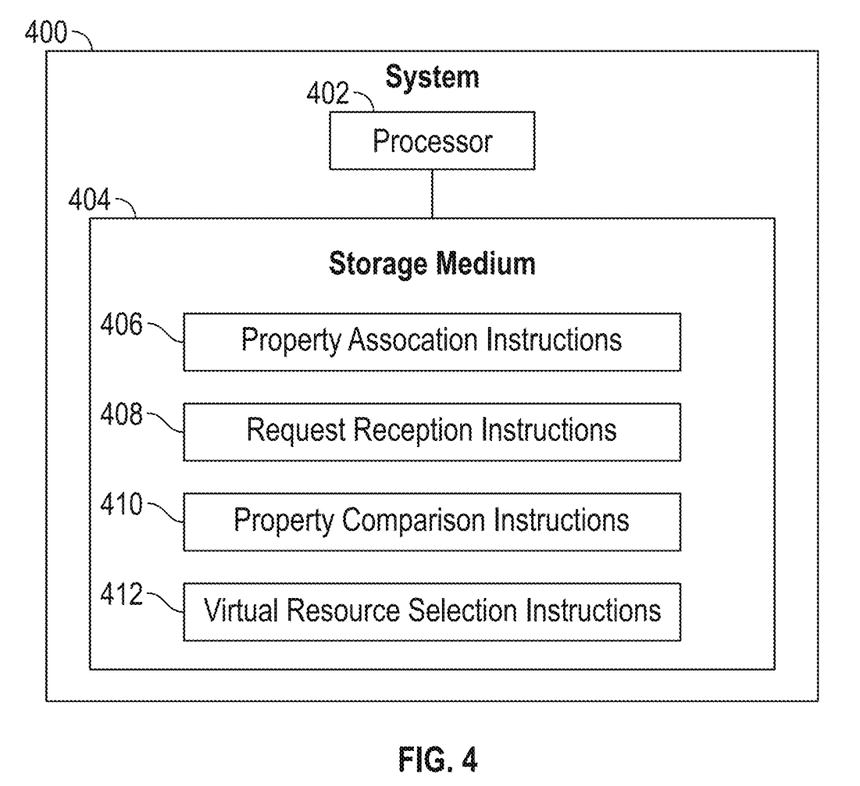
FIG. 4 is a block diagram of a system according to some examples.

FIG. 4 is a block diagram of a system 400 that includes a hardware processor 402 (or multiple hardware processors). The system 400 can be implemented as a single computer or as multiple computers.

A hardware processor can include a microprocessor, a core of a multi-core microprocessor, a microcontroller, a programmable integrated circuit, a programmable gate array, a digital signal processor, or another hardware processing circuit.

The system 400 further includes a storage medium 404 that stores machine-readable instructions executable on the hardware processor 402 to perform respective tasks. Machine-readable instructions executable on a hardware processor can refer to the instructions executable on a single hardware processor or the instructions executable on multiple hardware processors.

The machine-readable instructions include property association instructions 406 to associate, with a plurality of virtual resources deployed in a cloud environment, properties representative of characteristics of the virtual resources, the properties comprising a performance level of a virtual resource.

The machine-readable instructions include request reception instructions 408 to receive a request to create a virtual resource in the cloud environment. The machine-readable instructions further include property comparison instructions 410 to comparing properties of the virtual resource to be created for the request to the properties associated with the plurality of virtual resources. Use of the selected virtual resource for the request allows the instructions to avoid creating a new virtual resource in response to the request.

The machine-readable instructions additionally include virtual resource selection instructions 412 to, in response to the comparing, select a virtual resource from among the plurality of virtual resources as a candidate virtual resource for the request.

Figure 5:
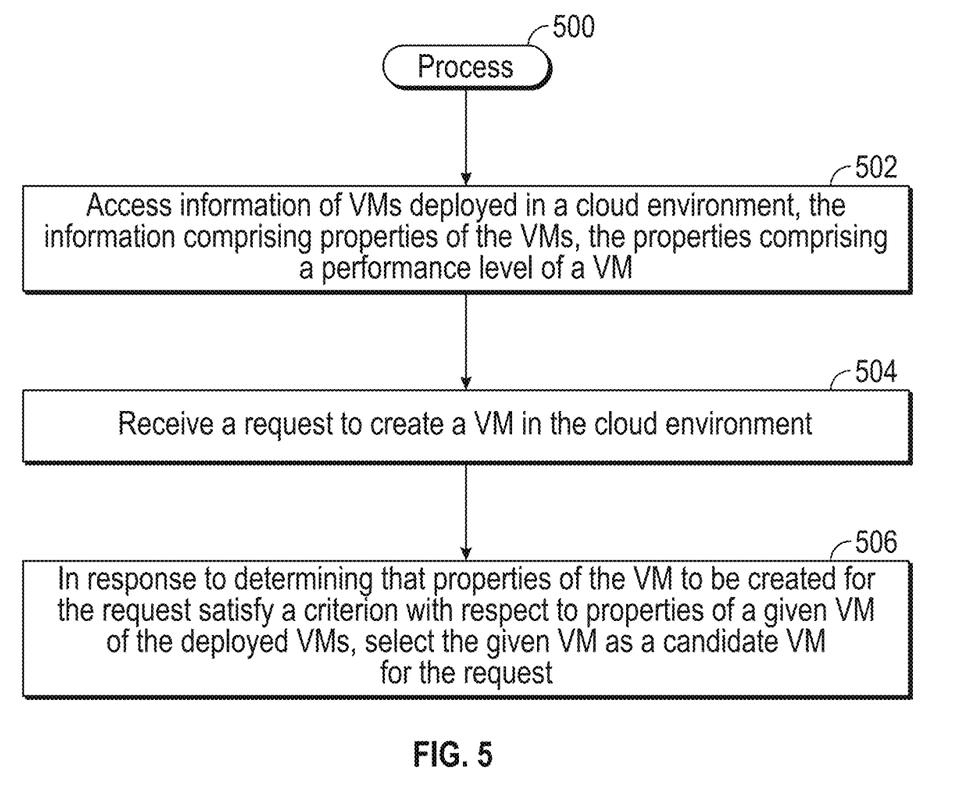
FIG. 5 is a flow diagram of a process according to further examples.

FIG. 5 is a flow diagram of a process 500 according to further examples. The process 500 includes accessing (at 502) information of VMs deployed in a cloud environment, the information comprising properties of the VMs, the properties comprising a performance level of a VM. The information of the VMs accessed includes information of cloud providers that deploy the VMs, and where the cloud environment includes a hybrid cloud environment.

The process 500 further includes receiving (at 504) a request to create a VM in the cloud environment. In addition, the process 500 includes, in response to determining that properties of the VM to be created for the request satisfy a criterion with respect to properties of a given VM of the plurality of VMs, selecting (at 506) the given VM as a candidate VM for the request. In this manner, the request can be satisfied using the given VM instead of creating a new VM.

A storage medium (e.g., 300 or 404) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that, upon execution, cause a system to:

associate, with each virtual resource of a plurality of virtual resources deployed in a cloud environment, properties representative of characteristics of the each virtual resource, wherein the properties comprise a performance level of a respective virtual resource of the plurality of virtual resources with which the properties are associated;

monitor utilizations of the plurality of virtual resources deployed in the cloud environment to obtain properties of the plurality virtual resources, the properties comprising tag elements corresponding to each virtual resource of the plurality of virtual resources, wherein the tag elements indicate resource amount and performance;

receive a request to allocate a virtual resource in the cloud environment;

determine whether the properties of the virtual resource to be created for the request satisfy a criterion with respect to the properties associated with a given virtual resource deployed in the cloud environment by comparing the tag elements associated with the virtual resource and the properties associated with the given virtual resource and whether a utilization of the given virtual resource indicated by the tag elements of the properties of the given virtual resource is below a threshold; and in response to the determining, select the given virtual resource as a candidate virtual resource for the request without creating a new virtual resource within the cloud environment.

2. The non-transitory machine-readable storage medium of claim 1, wherein the request is received from a tenant of the cloud environment, and the plurality of virtual resources are associated with the tenant.

3. The non-transitory machine-readable storage medium of claim 2, wherein the tenant is selected from among a user, an organization, or a project.

4. The non-transitory machine-readable storage medium of claim 1, wherein the properties associated with a respective virtual resource of the plurality of virtual resources further comprise a number of processing resources of the respective virtual resource.

5. The non-transitory machine-readable storage medium of claim 1, wherein the properties associated with a respective virtual resource of the plurality of virtual resources further comprise a capacity of a storage resource of the respective virtual resource.

6. The non-transitory machine-readable storage medium of claim 1, wherein the properties associated with a respective virtual resource of the plurality of virtual resources further comprise a type of an operating system of the respective virtual resource.

7. The non-transitory machine-readable storage medium of claim 1, wherein the plurality of virtual resources comprise a plurality of virtual machines, and the virtual resource to be allocated for the request comprises a virtual machine to be allocated for the request.

8. The non-transitory machine-readable storage medium of claim 1, wherein the cloud environment is selected from among a public cloud environment, a private cloud environment, and a hybrid cloud environment.

9. A system comprising:
a processor; and
a non-transitory storage medium storing instructions executable on the processor to:
associate, with each virtual resource of a plurality of virtual resources deployed in a cloud environment, properties representative of characteristics of the each virtual resource, wherein the properties comprise a performance level of a respective virtual resource of the plurality of virtual resources with which the properties are associated;
monitor utilizations of the plurality of virtual resources deployed in the cloud environment to obtain properties of the plurality virtual resources, the properties comprising tag elements corresponding to each virtual resource of the plurality of virtual resources, wherein the tag elements indicate resource amount and performance;
receive a request to allocate a virtual resource in the cloud environment;
comparing properties of the virtual resource to be allocated for the request to the properties associated with the plurality of virtual resources; and
determine whether the properties of the virtual resource to be created for the request satisfy a criterion with respect to the properties associated with a given virtual resource deployed in the cloud environment by comparing the tag elements associated with the virtual resource and the properties associated with the given virtual resource and whether a utilization of the given virtual resource indicated by the tag elements of the properties of the given virtual resource is below a threshold; and
in response to the determining, select the given virtual resource as a candidate virtual resource for the request without creating a new virtual resource within the cloud environment.

10. The system of claim 9, wherein use of the selected virtual resource for the request allows the instructions to avoid creating a new virtual resource in response to the request.

11. The system of claim 9, wherein the properties associated with a respective virtual resource of the plurality of virtual resources further comprise a type of an operating system of the respective virtual resource.

12. The non-transitory machine-readable storage medium of claim 9, wherein the plurality of virtual resources comprise a plurality of containers, and wherein the virtual resource to be allocated for the request comprises a container.

13. The system of claim 9, wherein the properties associated with a respective virtual resource of the plurality of virtual resources further comprise a number of processing resources of the respective virtual resource.

14. The system of claim 9, wherein the properties associated with a respective virtual resource of the plurality of virtual resources further comprise a capacity of a storage or memory resource of the respective virtual resource.

15. The system of claim 9, wherein the plurality of virtual resources comprise a plurality of containers, and wherein the virtual resource to be allocated for the request comprises a container.

16. A method performed by a system comprising a hardware processor, comprising:
accessing information of a plurality of virtual machines or containers deployed in a cloud environment, the information comprising properties of virtual machines or containers, wherein the properties comprise a performance level of a respective virtual machine or container of the plurality of virtual machines or containers;
monitoring utilizations of the plurality of virtual machines or containers deployed in a cloud environment to obtain properties of the plurality virtual resources, the properties comprising tag elements corresponding to each virtual resource of the plurality of virtual resources, wherein the tag elements indicate resource amount and performance;
receiving a request to allocate a virtual machine or a container in the cloud environment; and
determining whether the properties of the virtual resource to be created for the request satisfy a criterion with respect to the properties associated with a given virtual resource deployed in the cloud environment by comparing the tag elements associated with the virtual resource and the properties associated with the given virtual resource and whether a utilization of the given virtual resource indicated by the tag elements of the properties of the given virtual resource is below a threshold; and
in response to the determining, selecting the given virtual resource as a candidate virtual resource for the request without creating a new virtual resource within the cloud environment.

17. The method of claim 16, further comprising satisfying the request using the given virtual machine or the given container instead of creating a new virtual machine or a new container.

18. The method of claim 16, wherein accessing the information of the virtual machines comprises accessing information of cloud providers that deploy the plurality of virtual machines or containers, and wherein the cloud environment comprises a hybrid cloud environment.

19. The method of claim 16, wherein the properties associated with a respective virtual machine or a respective container of the plurality of virtual machines or containers further comprise a number of processing resources of the respective virtual machine or the respective container.

20. The method of claim 16, wherein the properties associated with a respective virtual machine or a respective container of the plurality of virtual machines or containers further comprise a capacity of a storage or memory resource of the respective virtual machine or the respective container.

* * * * *